United States Patent
Bjørner

(10) Patent No.: US 7,506,007 B2
(45) Date of Patent: Mar. 17, 2009

(54) INTERVAL VECTOR BASED KNOWLEDGE SYNCHRONIZATION FOR RESOURCE VERSIONING

(75) Inventor: Nikolaj S. Bjørner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 10/791,041

(22) Filed: Mar. 1, 2004

(65) Prior Publication Data

US 2004/0186916 A1  Sep. 23, 2004

Related U.S. Application Data

(60) Provisional application No. 60/451,706, filed on Mar. 3, 2003.

(51) Int. Cl.
*G06F 12/00* (2006.01)
(52) U.S. Cl. .......................... 707/204; 707/203; 714/20
(58) Field of Classification Search ................. 703/203, 703/204
See application file for complete search history.

(56) References Cited

U.S. PATENT DOCUMENTS

| | | | | |
|---|---|---|---|---|
| 5,418,947 A * | 5/1995 | Hsu et al. | ...................... | 707/1 |
| 5,486,826 A | 1/1996 | Remillard | | |
| 5,765,171 A * | 6/1998 | Gehani et al. | ............... | 707/203 |
| 6,317,754 B1 * | 11/2001 | Peng | ......................... | 707/203 |
| 6,321,232 B1 * | 11/2001 | Syeda-Mahmood | ...... | 707/104.1 |
| 6,412,017 B1 | 6/2002 | Straube | | |
| 6,938,048 B1 | 8/2005 | Jilk et al. | .................... | 707/102 |
| 7,035,847 B2 | 4/2006 | Brown | | |
| 2001/0048728 A1 * | 12/2001 | Peng | ......................... | 375/354 |
| 2003/0187947 A1 | 10/2003 | Lubbers | | |
| 2004/0068523 A1 | 4/2004 | Keith | | |
| 2004/0111390 A1 | 6/2004 | Saito | | |
| 2004/0177100 A1 | 9/2004 | Bjorner | | |

(Continued)

FOREIGN PATENT DOCUMENTS

EP  0 661 652  5/1995

(Continued)

OTHER PUBLICATIONS

Richard G. Guy, Peter L. Reiher, David Ratner, Michial Gunter, Wilkie Ma, Gerald J. Popek, Rumor: Mobile Data Access Through Optimistic Peer-to-Peer Replication, Proceedings of the Workshops on Data Warehousing and Data Mining: Advances in Database Technologies, p. 254-265, Nov. 19-20, 1998, Provided as pp. 1-12.*

(Continued)

*Primary Examiner*—Sathyanarayan Pannala
(74) *Attorney, Agent, or Firm*—Merchant & Gould PC

(57) ABSTRACT

A method and system for synchronizing objects among members of a replica set. An interval vector is maintained on each member. The interval vector includes one or more intervals each of which has an upper and lower bound. During synchronization, the member sends the interval vector to the member with which it is synchronizing. The other member examines the interval vector and finds resources with versions that are not included in any of the intervals of the interval vector. The other member then transmits these resources to the first member which uses them to update its store. The first member also updates its interval vector to account for the received resources.

16 Claims, 7 Drawing Sheets

U.S. PATENT DOCUMENTS

| | | |
|---|---|---|
| 2004/0186916 A1 | 9/2004 | Bjorner |
| 2005/0015413 A1 | 1/2005 | Teodosiu et al. |
| 2005/0099963 A1 | 5/2005 | Multer et al. |
| 2005/0125621 A1 | 6/2005 | Shah |
| 2006/0031188 A1 | 2/2006 | Lara et al. |
| 2007/0168516 A1 | 7/2007 | Huisheng et al. |

FOREIGN PATENT DOCUMENTS

| EP | 974895 A2 * | 1/2000 |
|---|---|---|

OTHER PUBLICATIONS

Cox et al. "Communication Timestamps for File System Synchronization" Computer Science Group Harvard University 10 pages. Published 2001.*

Petersen et al. "Flexible Update Propogation for Weakly Constent Replication" SOSP-16 1997 pp. 288-301.*

Strehl et al. "Interval Diagram Techniques for Symbolic Model Checking of Petri Nets" Mar. 9-12, 1999 2 pages.*

Grönvall, Björn; Westerlund, Assar; Pink , Stephen; "The Design of a Multicast-based Distributed File," 1999, [26 pages].

Barreto, João; Ferreira, Paulo; "A Replicated File System for Resource Constrained Mobile Devices," 2004, [9 pages].

Welch, Terry A., "A Technique for High-Performance Data Compression," IEEE, Jun. 1984, pp. 8-19.

Birrell et al. The Echo Distributed File System. Digital Systems Rearch Center, Sep. 10, 1993, pp. 1-22.

Broder, Andrei Z. On the Resemblance and Containment of Documents. Proceedings of Compression and Complexity of SEQUENCES, Jun. 11-13, 1997, pp. 21-29.

Burns, Randal C. and Long, Darrel D.E. Efficient Distributed Backup with Delta Compression. IOPADS, 1997, pp. 1-11.

Chien, S. and Gratch, J. Producing Satisfactory Solutions to Scheduling Problems: An Iterative Constraint Relaxation Approach. Beacon eSpace Jet Propulsion Laboratory, Jun. 13, 1994, pp. 1-6.

Eshghi, Kave. Intrinsic References in Distributed Systems. Software Technology Laboratory, HP Klaboratories Palo Also, HPL-2002-32, Feb. 7, 2002, pp. 1-8.

Fisher, Doug. Iterative Optimization and Simplification of Hierarchical Clusterings. Journal of Artificial Intelligence Research 4, Apr. 1996, pp. 147-179.

Kumar, Puneet and Satyanarayanan M. Flexible and Safe Resolution of File Conflicts. USENIX Winter 1995 Technical Conference on Unix and Advanced Computing Systems, Jan. 16-20, 1995, pp. 1-15.

Manber, Udi. Finding Similar Files in a Large File System. USENIX Winter 1994 Technical Conference, Oct. 1993, pp. 1-11.

Merrells, John et al. LDAP Replication Architecture. IETF Draft, Aug. 5, 1998, pp. 1-31.

Miyashita, Kazuo and Sycara, Katia. Improving System Performance in Case-Based Iterative Optimization through Knowledge Filtering. Proceedings of the International Joint Conference on Artificial Intelligence; 1995; pp. 371-376.

Petersen, Karin et al. Bayou: Replicated Database Services for World-wide Applications. Proceedings of the 7th SIGOPS European Workshop, Connemara, Ireland; Sep. 1996, pp. 275-280.

Plan 9 Bell Labs [online]. Wikipedia, [Retrieved on Mar. 3, 2007], pp. 1-8. Retieved from: http://en.wikipedia.org/wiki/Plan_9_from_Bell_Labs.

Popek, Gerald J. et al. Replication in Ficus Distributed File Systems. Proceedings of the Workshop on Management of Replicated Data; Nov. 1990; pp. 20-25.

Schmnuck, Frank and Haskin, Roger. GPFS: A Shared-Disk File System for Large Computing Clusters. Proceedings of the Conference on File and Storage Technologies (FAST'02); Jan. 28-30, 2002; pp. 231-244.

Teodosiu, Dan et al. Optimizing File Replication over Limited-Bandwidth Networks using Remote Differential Compression. MSR-TR-2006-157; Nov. 1996; pp. 1-16.

Davies, C. T., Jr., *Data Processing Spheres of Control*, IBM Systems Journal 17(2): 179-198 (1978).

Hare, Van Court, Jr., Editor, *A Special Report on the SIGBDP Forum "The New Data Base Task Group Report"*, Atlantic City, NJ, May 17, 1971, vol. 3, No. 3, Special Issue, 1971.

IBMTransarc[Retrieved on Dec. 13, 2007], pp. 1-49, Retrieved from internet: URL: http://www-01.ibm.com/common/ssi/rep_ca/0/897/ENUS297-220/index.html.

*NFS: Network File System Protocol Specification*, [online] [Retrieved on 03/0407] pp. 1-27, URL: http://tools.ietf.org/html/rfc1094, Sun Microsystems, Inc., RFC 1094, Mar. 1989.

Braam, P.J., *The Coda Distributed File System*, pp. 46-51, Linux Journal, Jun. 1998.

*List of File System* [*online*] Retrieved on Dec. 11, 2007 pp. 1-8. Retrieved from Wikipedia internet URL: http://en.wikipedia.org/wiki/List_of_file_systems.

Broder, Andrei Z., On the Resemblance and Containment of Documents (*Proceedings of Compression and Complexity of Sequences* 1997, pp. 21-29, From 1998 IEEE Archives No. 0-8186-8132-2/98.

Merrells, et al., *LDAP Replication Architecture*, IETF Draft Document, Mar. 2, 2000, pp. 1-95 (Aug. 31, 2007 filing).

*Overview of the Distributed File System Solution in Microsoft Windows Server 2003 R2*, [online]. [Retrieved on Jul. 20, 2006] pp. 1-15. Retrieved from internet: URL; http://technet2.microsoft.com/WindowsServer/en/library/d3afe6ee-3083-4950-a093-8ab74.html.

Eshghi, Kave. Intrinsic References in Distributed Systems. Proceedings of the 22nd International Conference on Distributed Computing Systems Workshops (ICDCSW'02), Jul. 2-5, 2002, Vienna, Proceedings.

* cited by examiner

3

INTERVAL VECTOR BASED KNOWLEDGE SYNCHRONIZATION FOR RESOURCE VERSIONING

CROSS-REFERENCE TO RELATED APPLICATION

This application claims the benefit of U.S. Provisional Application No. 60/451,706, filed Mar. 3, 2003, entitled INTERVAL VECTOR BASED KNOWLEDGE SYNCHRONIZATION FOR FILE VERSIONING, which application is incorporated herein in its entirety.

FIELD OF THE INVENTION

The invention relates generally to computer networks, and more particularly to resource replication in a computer network.

BACKGROUND

Systems for replicating resources are becoming increasingly important to ensure availability and fault tolerance in large networks. Corporate networks that replicate files containing domain credentials and policies are one example where availability, scalability, consistency, and reliability are critical. These requirements do not necessarily interact in a cooperative manner.

Version vectors have been used when replicating resources. A version vector may be viewed as a global set of counters or clocks of machines participating in a replica set. Each machine participating in the replica set maintains a version vector that represents the machine's current latest version and the latest versions that the machine has received with respect to other machines. Each time a resource is created, modified, or deleted from a machine, the resource's version is set to a version number equivalent to the current version number for that machine plus one. The version vector for that machine is also updated to reflect that the version number for that machine has been incremented.

During synchronization, a version vector may be transmitted for use in synchronizing files. For example, if machines A and B engage in a synchronization activity such as a join, machine B may transmit its version vector to A. Upon receiving B's version vector, A may then transmit changes for all resources, if any, that have versions not subsumed by B's version vector.

Version vectors have shortcomings when the growth of knowledge on a machine is not monotonic or sequential. For example, when version vectors are used in file replication systems, some objects may need one or more other objects to be created before they can be created. For example, both a directory and files in that directory may be new and need to be transmitted during synchronization. If a file is transmitted before its parent directory, an error may occur when creating the file. Version vectors do not adequately address this and other problems.

SUMMARY

Briefly, the present invention provides a method and system for synchronizing objects among members of a replica set. During synchronization, a member sends its interval vector to another member with which it is synchronizing. The other member examines the interval vector and finds resources with versions that are not included in any of the intervals sets of the interval vector. The other member then transmits these resources to the first member which uses them to update its store. The first member also updates its interval vector to account for the received resources.

In one aspect of the invention, a member may send an interval vector that is an under-approximation of its interval vector to limit bandwidth usage or an over-approximation of its interval vector to collect information about what data has possibly been replicated.

In another aspect of the invention, each interval set in an interval vector may be represented on top of a binary search tree, a decision diagram, or similar representations. Representing an interval set as an interval decision diagram may greatly compress the size needed to store the interval set.

Other advantages will become apparent from the following detailed description when taken in conjunction with the drawings, in which:

DETAILED DESCRIPTION

Exemplary Operating Environment

Figure 1:
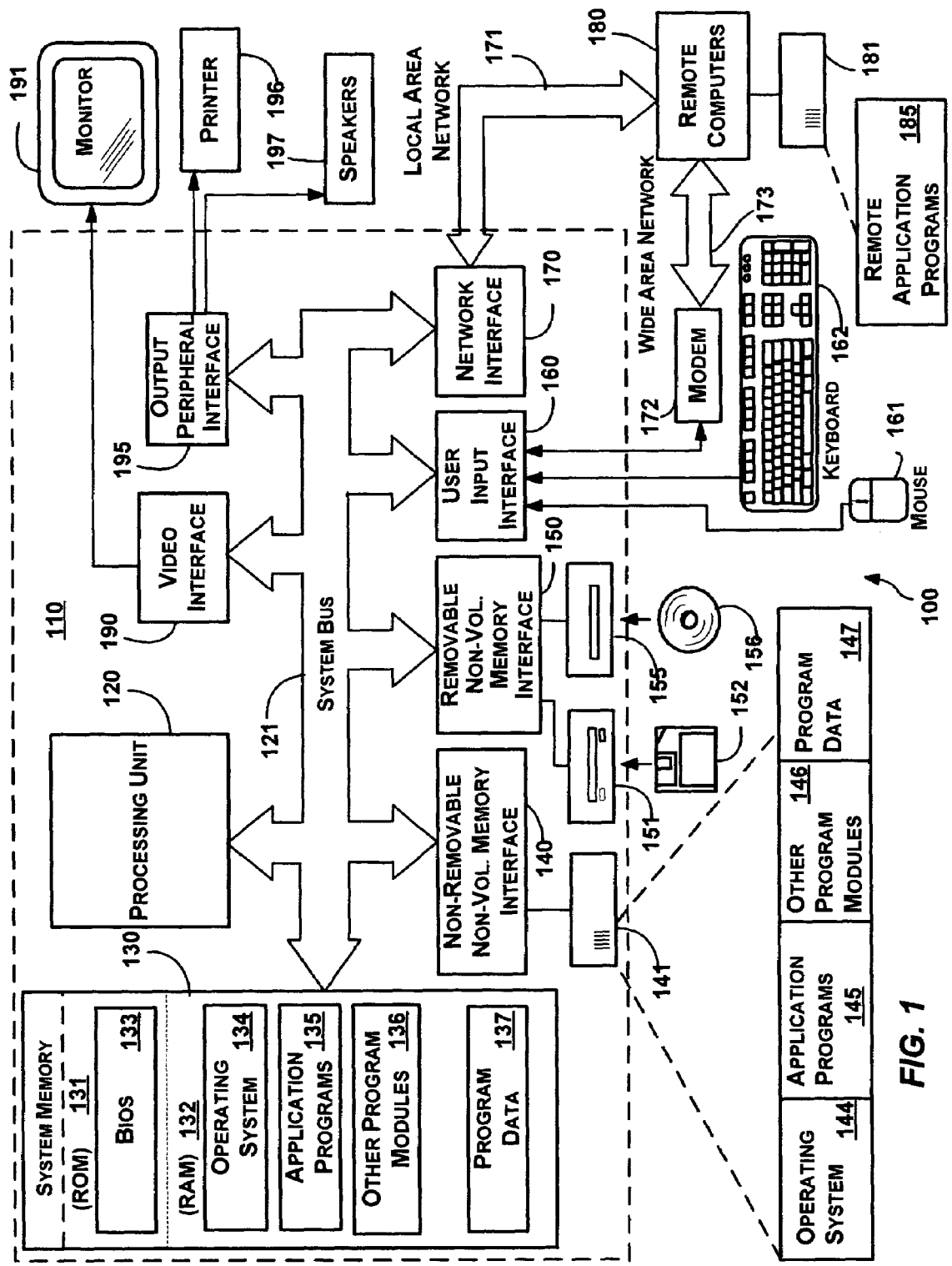
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interval Vectors

An interval vector may be thought of as a table that includes member identifiers in one column and intervals of version sequence numbers in another column. An interval vector maps member identifiers to intervals of version sequence numbers. In this document, these intervals are sometimes referred to as interval sets. An interval vector is maintained on each member. Each member identifier is unique. Each interval set may be represented compactly as a collection of non-overlapping intervals. Each member's interval vector represents that member's knowledge of versions on each member of the replica set. Each interval in an interval set is represented by a pair of values, including a lower and upper bound. The intervals in an interval set may be linearly ordered by either endpoint.

An interval set may be represented as a binary search tree, a decision diagram, or any other representation without departing from the spirit or scope of the invention. Binary search trees include AVL trees, red-black (RB) trees, splay trees, and the like. Decision diagrams include binary decision diagrams (BDDs), interval decision diagrams (IDDs), and the like. In essence, a decision diagram is a directed acyclic graph.

When an interval set is represented as a binary search tree, a lookup operation may be performed in a manner similar to that used when performing a lookup of simple integers in a binary search tree. Insertion and deletion, however, operate somewhat differently to that used when performing similar operation in a binary search tree of simple integers. For example, insertion may merge multiple intervals and may actually reduce the number of nodes, while deletion may split one interval into two, thus increasing the number of nodes instead of decreasing them. Examples of performing a lookup and inserting and deleting intervals will be described in more detail in conjunction with FIGS. 3-5.

In a decision diagram, there is a distinguished initial node with one outgoing edge labeled by 0 and another outgoing edge labeled by 1. All internal nodes may be assumed reachable from the initial node. Each internal node has two outgoing edges, labeled by 0 and 1, respectively. Child(n,1) is the node reached from n by following the edge labeled by 1, and child(n,0), the node reached from node n by following the edge labeled by 0. The initial and internal nodes are labeled by numbers 0, . . . , m−1; where m is fixed a-priori. The labeling on nodes that are reachable by following any of the outgoing edges on a given node is strictly smaller than the labeling on the given node.

Terminal nodes are nodes that do not have any outgoing edges. In binary decision diagrams, each terminal node is labeled by a truth value of either True or False. In interval decision diagrams, terminal nodes are labeled by interval lengths or by a special symbol "⊥".

Binary decision diagrams may be interpreted as sets on m bit numbers in the following manner: Let $b_{m-1}, b_{m-2}, \ldots, b_0$ be the bits in the binary expansion of a given number k ($k = 2^{m-1}b_{m-1} + 2^{m-2}b_{m-2} + \ldots b_0$) and let n be the initial node with label $1(n)$, where $0 \leq 1(n) < m$. The next node to visit is given by following the edge labeled by $b_{1(n)}$. In the terminology established above, this is child $(n, b_{1(n)})$. This process may be repeated until a terminal node is reached. If the terminal node is labeled as True, then k is a member of the set represented by the BDD; otherwise k is not a member. It will be recognized that the size of binary decision diagrams is bounded by a number proportional to the number of intervals in an interval set. Since there is a path to True in the binary decision diagram for every start and end position, all other numbers are covered by edges departing one of these paths and directly hitting one of the terminal nodes.

Figure 2:
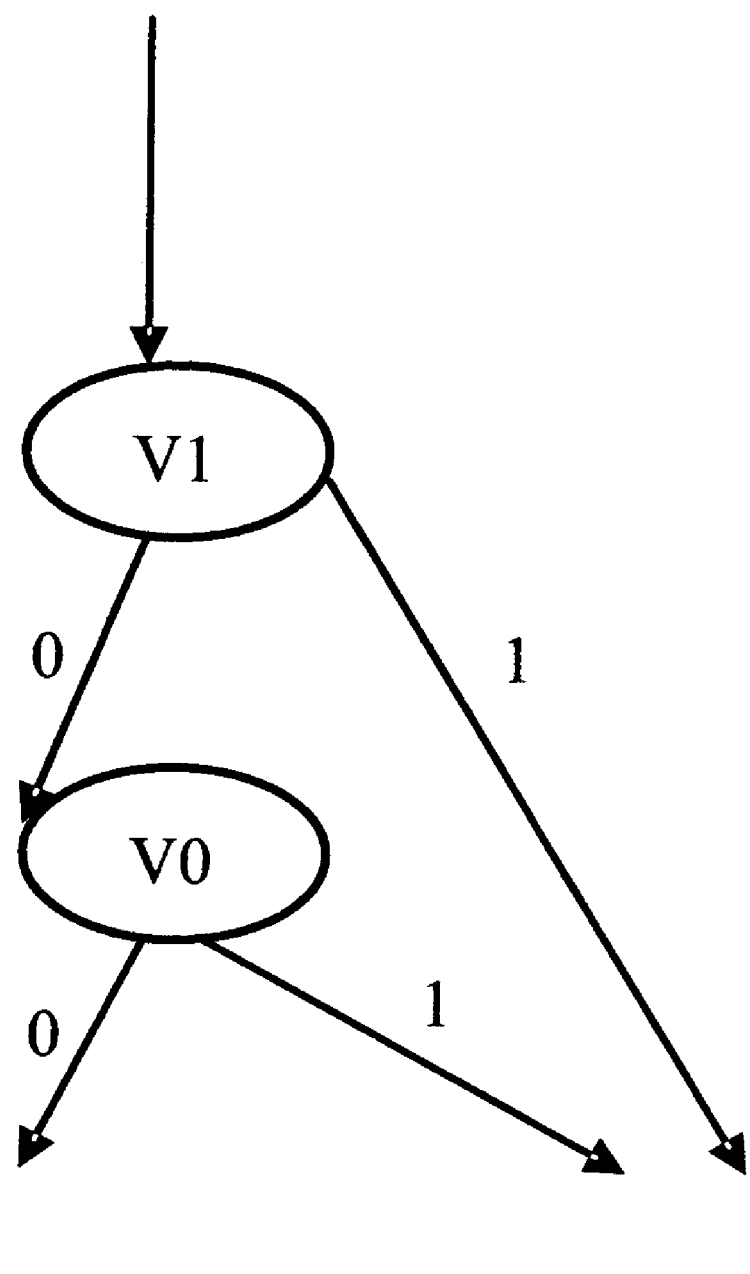
FIG. 2 is a block diagram that represents an exemplary instance of an interval decision diagram in accordance with various aspects of the invention.

An interval decision diagram may also be interpreted as sets of m bit numbers. The traversal of initial and internal nodes is somewhat similar to binary decision diagrams and will be understood by those skilled in the art. The size of an IDD for a given interval set will not increase over the size of a balanced binary search tree that represents the same interval set. Indeed, the IDD may compress the space needed to store the interval set over that used by a balanced binary search tree by a significant factor. For example, the size of an IDD for representing intervals [4k, 4k+2], $k = 0 \ldots 2^{n-2} - 1$ is constant, but the binary search tree representation is of size O(n). FIG. 2 shows an instance of such an IDD, containing the intervals [0, 2], [4, 6], [8, 10], [12, 14], when n=4, or just [0, 2], [4, 6], when n=3.

Interval sets for n-bit version sequence numbers may consume $O(2^n)$ space. It is, however, sound for replication to store and communicate either lower or upper approximations of interval vectors. An upper approximation is an interval vector whose values contained in intervals form a superset of the original interval vector. On the other hand, a lower bound forms a subset.

Basic Operations on Interval Sets

Below are some basic operations with respect to relevant operations for interval sets.

is=empty( ): This creates an empty interval set. With set-theoretic notation, {} may be used as shorthand for empty( ).

is'=insert (is, u, v): This inserts an interval into an interval set. A pair [u, v] is inserted in an interval set is by inserting the new interval if it does not overlap with any of the intervals in is, or in case of overlaps, replacing the one or more intervals by larger interval. For example, insert ({[0,5], [8,8]}, 3, 6)={[0,6], [8,8]}, insert ({[0,5], [8,8]}, 3, 7)={[0,8]}, and insert ({[0,2], [8,9]}, 4, 5)={[0,2], [4,5], [8,9]}.

[v,w]=find(is, u): Find the interval containing the specified version u. For example, find({[0,5], [7,8]}, 3)=[0,5].

is'=delete(is, u, v): Delete an interval from an interval set. For example, delete ({[0,5], [7,8]}, 2, 4)={[0,2], [5,5], [7,8]}.

Derived Operations on Interval Sets

The union of two interval sets may be computed by enumerating intervals from one chain and inserting those into the other. Similarly, an intersection may be computed by enumerating intervals from both interval sets in order and creating a third interval set by inserting intervals that are part of both. A set-wise complement may be computed by enumerating intervals from the version chain to be deleted and calling delete for each such interval.

Interval sets form a lattice by set-theoretical inclusion. For any number n, a domain $IS_n$ containing at most n version intervals may be formed. The domain $IS_\infty$ is the completion $IS_1 \cup IS_2 \cup IS_3 \ldots$. In contrast to $IS_\infty$ the domains $IS_n$ are not lattices. For example, in $IS_2$, the least superset of $\{[1,1], [3,3]\}$ and $\{[3,3], [5,5]\}$ is not in $IS_2$ but in $IS_3$. In replication applications two classes of forgetful functors from $IS_\infty$ to $IS_n$ are interesting: The class of under-approximations, and, to a lesser degree, the class of over-approximations. An under-approximation may be used to limit bandwidth when a client asks a server to supply updates whose versions are not present in an interval vector. An over-approximation may be used to collect information of what data has possibly been replicated (where the under-approximation says what has necessarily been replicated).

Binary Search Tree Representation

The basic operations find, insert, and delete may be implemented on top of AVL trees or similar representations such as Splay trees and RB-trees. AVL trees are described in G. M. Adelson-Velskii and E. M. Landis, "An algorithm for the organization of information", 1962, which is hereby incorporated by reference.

The internal nodes in AVL trees may be associated with disjoint intervals and may be ordered by the value of the lower bounds. The find operation recursively compares a queried value (i.e., the value to find) with the interval associated with the present node and traverses left or right sub-trees depending on how the queried value compares to the bounds of the interval. If the queried value is within the lower and upper bound of the present node, find will return the present node. If the queried value is greater than the value of the upper bound, the right sub-tree may be searched. If the queried value is less than the value of the lower bound, the left sub-tree may be searched.

Figure 3:
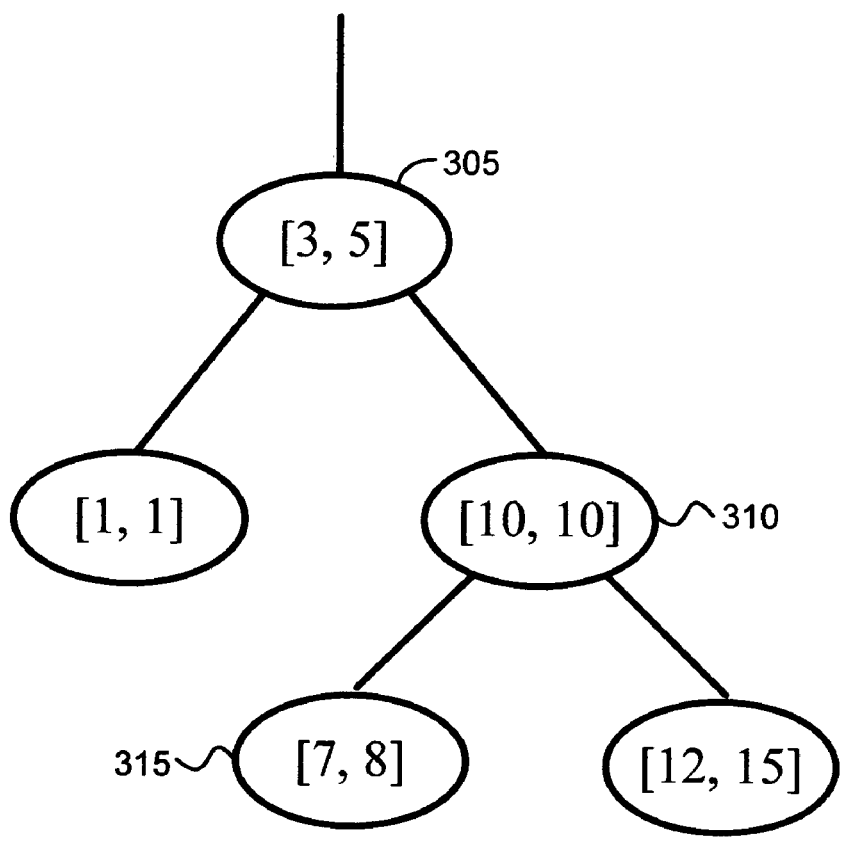
FIG. 3 is a block diagram representing an exemplary AVL tree that represents an exemplary interval set in accordance with various aspects of the invention.

FIG. 3 is a block diagram representing an exemplary AVL tree in accordance with various aspects of the invention. Notice that the nodes are arranged such that taking a branch to the left of a selected node results in reaching a node with an interval with an upper bound less than the lower bound of the interval of the selected node, while taking a branch to the right of the selected node results in reaching a node with an interval having a lower bound greater than the upper bound of the interval of the selected node.

An example of finding the interval containing a version u is illustrative of the find operation. Let is=the interval set represented by AVL tree shown in FIG. 3. Then, find (is, 7) will yield [7,8]. The find operation starts with node 305. The number 7 is larger than the node 305's upper bound 5, so the right branch is taken to node 310. The number 7 is smaller than node 310's lower bound 10, so the left branch is taken to node 315. The interval of node 315 includes 7, so this interval is returned.

The insert operation extends find by comparing for the various combinations of possible interval overlaps. In this process, the insert operation may build larger intervals as it detects overlaps and inserts those intervals recursively.

Figure 4:
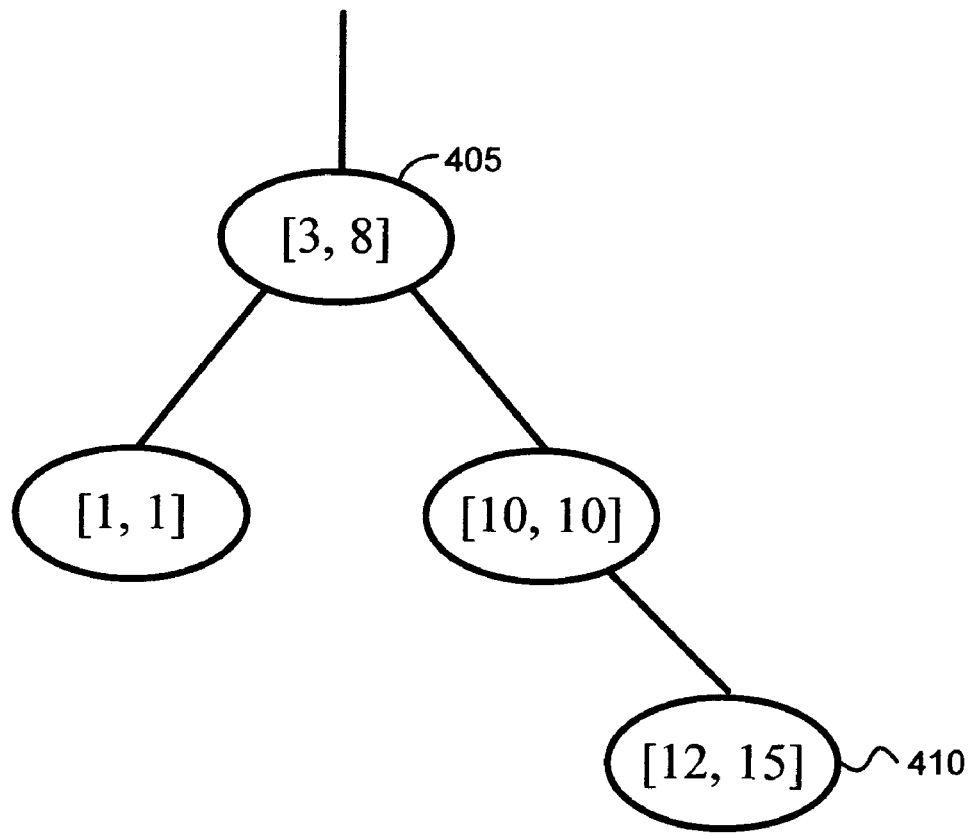
FIG. 4 is a block diagram representing an exemplary AVL tree that represents an exemplary interval set that results from inserting a particular interval in the AVL tree of FIG. 3.

For example, inserting the interval [6, 6] into the AVL tree of FIG. 3 may result in AVL tree shown in FIG. 4. Note that node 315 of FIG. 3 was eliminated and the interval therein combined with the interval in node 305 to create the AVL tree with node 405 shown in FIG. 4.

The delete operation may increase the number of nodes. For example, deleting the interval [13, 13] from the AVL tree of FIG. 3 may result in the AVL tree shown in FIG. 5. Note that the interval in node 410 of FIG. 4 was broken apart into intervals shown in nodes 505 and 510 of FIG. 5 in the deletion.

Figure 5:
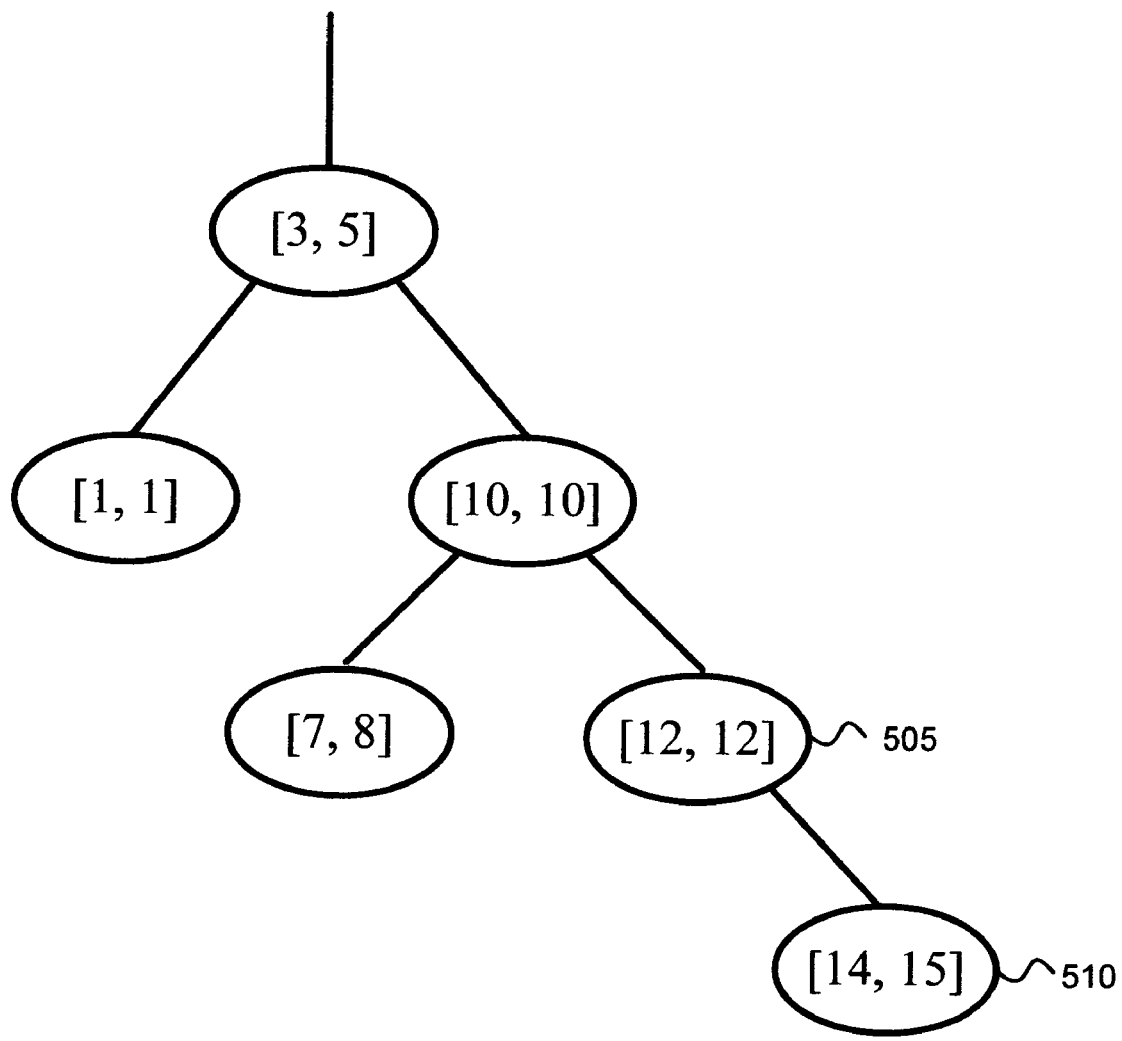
FIG. 5 is a block diagram representing an exemplary AVL tree that represents an exemplary interval set that results from deleting a particular interval from the AVL tree of FIG. 3.

It will be understood that the discussion in conjunction with FIGS. 3-5 may be applied to other types of binary search trees (e.g., RB trees, splay trees, and the like) without departing from the spirit or scope of the invention. It will also be understood that balancing of the AVL trees before or after an operation may also occur in a manner similar to balancing AVL trees containing only integers.

IDD Representation

Interval decision diagrams may exploit a trie-based representation. An IDD may be stored in a way similar to a BDD or MTBDD (multi-terminal BDD). See, e.g., Randal E. Bryant: Symbolic Boolean Manipulation with Ordered Binary-Decision Diagrams, ACM Computing Surveys 24(3): 293-318 (1992), where is hereby incorporated by reference. To ensure that insertions into IDDs return a canonical, minimal IDD, a hash table from triples (lo-node, label, hi-node) to unique nodes may be maintained. The hash table may be used to ensure that no two nodes are introduced with the same labeling and same children.

Resource Replication Using Interval Vectors

Interval vectors may be used in systems that replicate resources. A resource may be thought of as an object. Each resource is associated with resource data and resource meta-data. Resource data may include content and attributes associated with the content while resource meta-data includes other attributes that may be relevant in negotiating synchronization during replication (e.g., an interval vector). Resource data and meta-data may be stored in a database or other suitable store; in an alternate embodiment, separate stores may be used for storing resource data and meta-data.

Interval vectors may encode a watermark of knowledge and effectively handle an occasional gap of knowledge. In synchronizing resources, interval vectors may be used in at least two ways. First, interval vectors may be transmitted from a client to a server to filter updates generated on the server that the client already has. Second, interval vectors may be transmitted from a server to a client to update the client's knowledge state and to distinguish updates from conflicts. This exchanging of interval vectors allows overcoming challenges associated with recovering after an abnormal shutdown. For example, in an abnormal shutdown, meta-data from an update may be committed to the database while the interval vector from the exchange is not. An interval vector can be constructed by enumerating the meta-data entries, extracting the version numbers therefrom, and inserting the extracted version numbers into the interval vector. It will be recognized that interval vectors conveniently allow any gaps introduced by this process.

Figure 6:
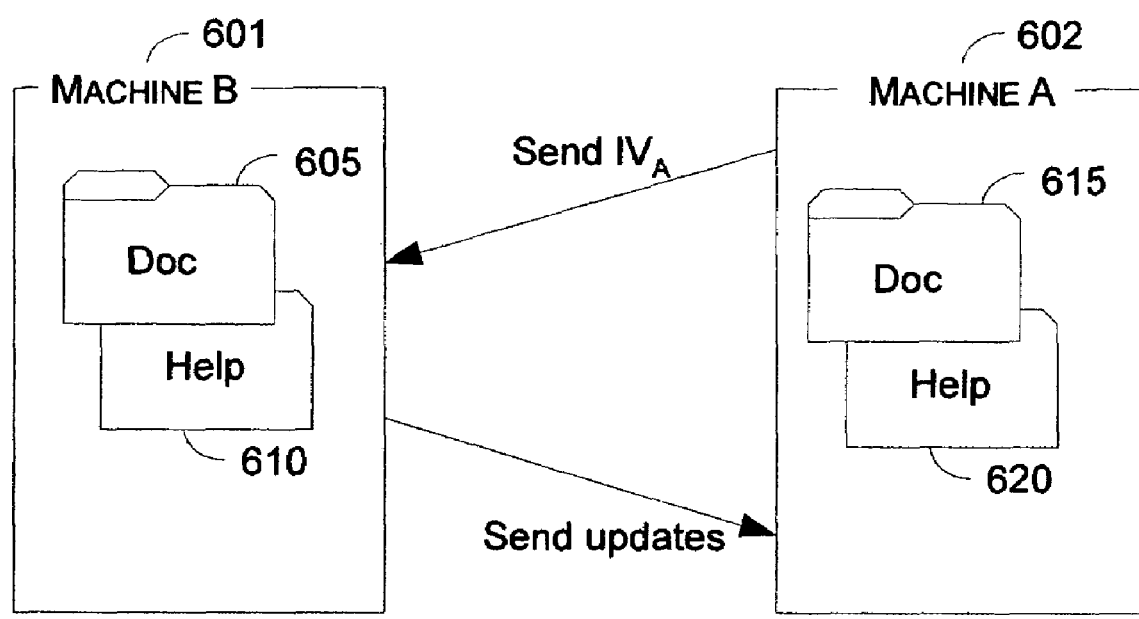
FIG. 6 is a block diagram representing an exemplary system for replicating resources in accordance with various aspects of the invention.

FIG. 6 is a block diagram representing an exemplary system for replicating resources in accordance with various aspects of the invention. Two machines, machine 601 (sometimes referred to as machine B or simply B) and machine 602 (sometimes referred to as machine A or simply A) are members of a replica set. A member of a replica set may reside on one or more machines and one machine may include one or more members. B includes two objects: Doc 605 and Help 610. The object Doc 605 is a directory that has a sub-directory named Help 610. Corresponding objects, i.e. object Doc 615 and object Help 620, exist on A.

Assume, for example, that A and B synchronized Doc 605 and Help 610 shortly after they were created and that at that time, they had global versions (B, 1) and (B, 2), respectively. After synchronizing, B modified Help 610 and assigned a version of (B, 3) to the modified Help 610. Thereafter, B modified Doc 605 and assigned a version of (B, 4) to the modified Doc 605. B then creates Pub, Lib and Bin, which receive versions (B, 5), (B, 6), and (B, 7), respectively. Sometime thereafter A and B synchronize again. When synchronizing with B, A sends its interval vector (IVA) to B. At this point, let $IV_A(B)=\{[1,2],[5,7]\}$, where $IV_A(B)$ represents A's interval set for resources on B. Assume that $IV_A(B)=\{[1,2],[5,7]\}$, for example, because A received Pub, Lib, and Bin in a previous synchronization. Upon receiving $IV_A$, B checks for version numbers or resources on B that are between 2 and 5 as well as those greater than 7. B finds that A does not have the updated versions for the modified Doc 605 and the modified Help 610. Consequently, B sends these modified resources to A. A receives the modified resources, stores them, and updates its interval vector with an insert($IV_A(B)$, 3, 4). This results in $IV_A(B)$ being set to $\{[1,7]\}$.

It will be recognized that interval vectors provide a mechanism that allows a client to receive and update its state of knowledge in an out of order fashion. For example, if a client connects to two servers to receive updates and the first server transmits updates with version numbers 1, 3, 4 and 5, then the client may instruct the second server that its interval vector contains the intervals [1,1], [3,5], as opposed to only communicating an interval of [0,0] to the second server. This use is particularly relevant to the synchronization of file systems, as changes may be required to be sent in order of directory ancestry. Thus, if a directory p contains files a and b, then p may be required to be sent before either a or b. However, version sequence numbers are assigned sequentially according to when resources change. Thus, if p is updated after a and b are placed in p, then a and b will have lower version sequence numbers than p.

In one embodiment of the invention, a machine sending resources to another machine attempts to send resources in a hierarchical manner. Resources that depend on the creation of other resources (e.g., a file that depends on a directory) are sent after the resources upon which they depend. This helps to ensure that each resource sent may be created properly.

In another embodiment of the invention, resources are sent with little or no regard to the order in which they need to be created. If a machine receive a resource that it is unable to create (e.g., a child is received before its parent), the receiving machine may simply adjust its interval vector to indicate that the resource still needs to be synchronized.

Figure 7:
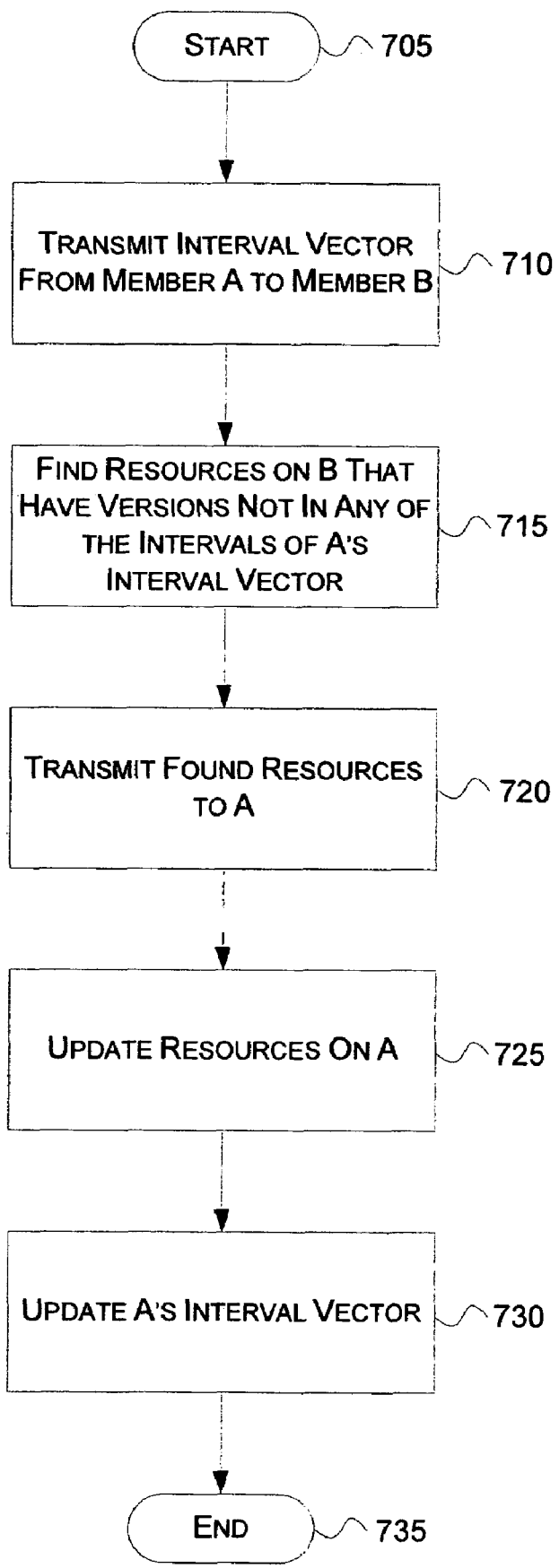
FIG. 7 is a dataflow diagram that generally represents exemplary steps that may occur when synchronizing resources in accordance with various aspects of the invention.

FIG. 7 is a dataflow diagram that generally represents exemplary steps that may occur when synchronizing resources in accordance with various aspects of the invention. The process begins at block 705 as two machines (e.g., machine A and machine B) begin synchronizing.

At block 710 A's interval vector is transmitted to B. At block 715, B finds resources on B that have versions that are not in any of the intervals of A's transmitted interval vector. At block 720, the found resources are transmitted to A. At block 725, A updates it resources based on the resources transmitted from B. At block 730, A updates its interval vector to account for the updated resources received from B. At block 735, the process ends.

Figure 8:
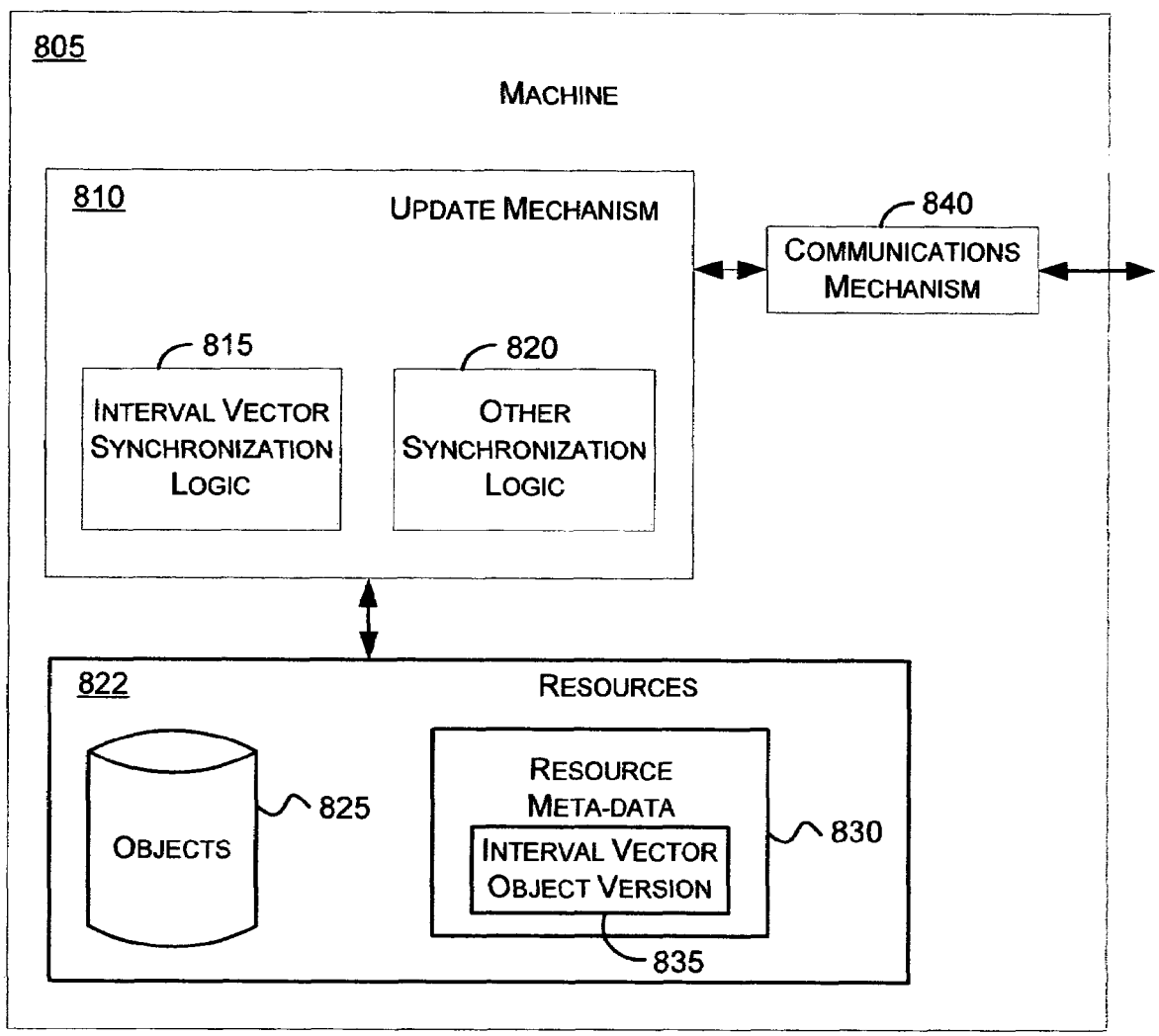
FIG. 8 is a block diagram representing a machine configured to operate in a resource replication system in accordance with various aspects of the invention.

FIG. 8 is a block diagram representing a machine configured to operate in a resource replication system in accordance with various aspects of the invention. The machine 805 includes an update mechanism 810, resources 822, and a communications mechanism 840.

The update mechanism 810 includes interval vector synchronization logic 815 that operates as described previously. The other synchronization logic 820 includes synchronization logic other than the interval vector synchronization logic (e.g., what to do in case of conflicting updates). Although the interval vector synchronization logic 815 and the other synchronization logic are shown as separate boxes, they may be combined in whole or in part.

The resources 822 include the objects store 825 for storing objects and the resource meta-data store 830. Although shown in the same box, the objects store 825 may be stored together or in a separate store relative to the resource meta-data store 830. Among other things, resource meta-data store 830 may include object versions for each of the object in objects store 825 as well as an interval vector (block 835).

The communications mechanism 840 allows the update mechanism 810 to communicate with other update mechanisms (not shown) on other machines. Together, the update mechanisms determine which resources should be synchronized and how the synchronization may occur. The communications mechanism 840 may be a network interface or adapter 170, modem 172, or any other means for establishing communications as described in conjunction with FIG. 1.

It will be recognized that other variations of the machine shown in FIG. 8 may be implemented without departing from the spirit or scope of the invention.

As can be seen from the foregoing detailed description, there is provided an improved method and system for replicating resources in a computer system. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer storage medium having computer-executable instructions, comprising:
    maintaining first interval vector, the first interval vector comprising at least two-intervals of versions, each interval having an upper bound and a lower bound, and the first interval vector comprising at least one gap in versions between two intervals;
    evaluating the first interval vector to identify the gap;
    using the gap in the first interval vector to determine that a resources is out-of-sync between a first member and a second member of a replica set, wherein the resource has a version contained within the gap of the first interval vector;
    synchronizing the resources; and
    updating the first interval vector to indicate that the resource is synchronized.

2. The computer storage medium of claim 1, wherein each version is a number.

3. The computer storage medium of claim 1, wherein the intervals of the first interval vector are represented as nodes of a binary search tree.

4. The computer storage medium of claim 3, wherein the binary search tree is selected from the group consisting of an AVL tree, a red-black tree, and a splay tree.

5. The computer storage medium of claim 3, wherein each non-terminal node of the binary search tree has at least one child, the child having an interval with an upper bound less than the lower bound of the interval in the child's parent node or having an interval with a lower bound greater than the upper bound of the child's parent node.

6. The computer storage medium of claim 3, wherein updating the first interval vector to indicate that the at least one resource is synchronized comprises reducing the number of nodes in the binary search tree.

7. The computer storage medium of claim 1, further comprising transmitting a second interval vector from the second member of the replica set to the first member of the replica set, the second interval vector serving to distinguish updates from conflicts.

8. The compute storage medium of claim 1, wherein the out-of-sync resource is organized in a sequence determined by its corresponding version number and wherein synchronizing the at least one resources comprises transmitting the resources in an order other than the sequence.

9. The computer storage medium of claim 1, wherein the first interval vector is represented by an interval decision diagram having internal and leaf nodes, wherein internal nodes represent binary digits in a binary expansion of a version sequence number and have two outgoing edges.

10. The computer storage medium of claim 9, wherein the interval decision diagram remains the same size regardless of the number of intervals in the interval vector.

11. A computer implemented method, comprising:
  maintaining a interval vector, the interval vector comprising at least two-intervals of versions, each interval having an upper bound and a lower bound, and the interval vector comprising at least one gap in versions between two intervals;
  evaluating the interval vector to identify the gap;
  using the gap in the interval vector to determine that a resource is out-of-sync between a first member and a second member of a replica set, wherein the resource has a version contained within the gap of the interval vector;
  synchronizing the resource; and
  updating the interval vector to indicate that the resources is synchronized.

12. The method of claim 11, wherein each version is a number.

13. The method of claim 11, wherein the intervals of the interval vector are represented as nodes of a binary search tree.

14. The method of claim 13, wherein the binary search tree is selected from the group consisting of an AVL tree, a red-black tree, and a splay tree.

15. The method of claim 13, wherein each non-terminal node of the binary search tree has at least one child, the child having an interval with an upper bound less than the lower bound of the interval in the child's parent node or having an interval with a lower bound greater than the upper bound of the child's parent node.

16. The computer implemented method of claim 11, wherein the binary search tree is selected from the group consisting of an AVL tree, a red-black tree, and a splay tree.

* * * * *